Oct. 26, 1954 — H. W. KLAGES — 2,692,447
LAND LEVELING AND EXCAVATING MACHINE
Filed April 3, 1952 — 2 Sheets-Sheet 2

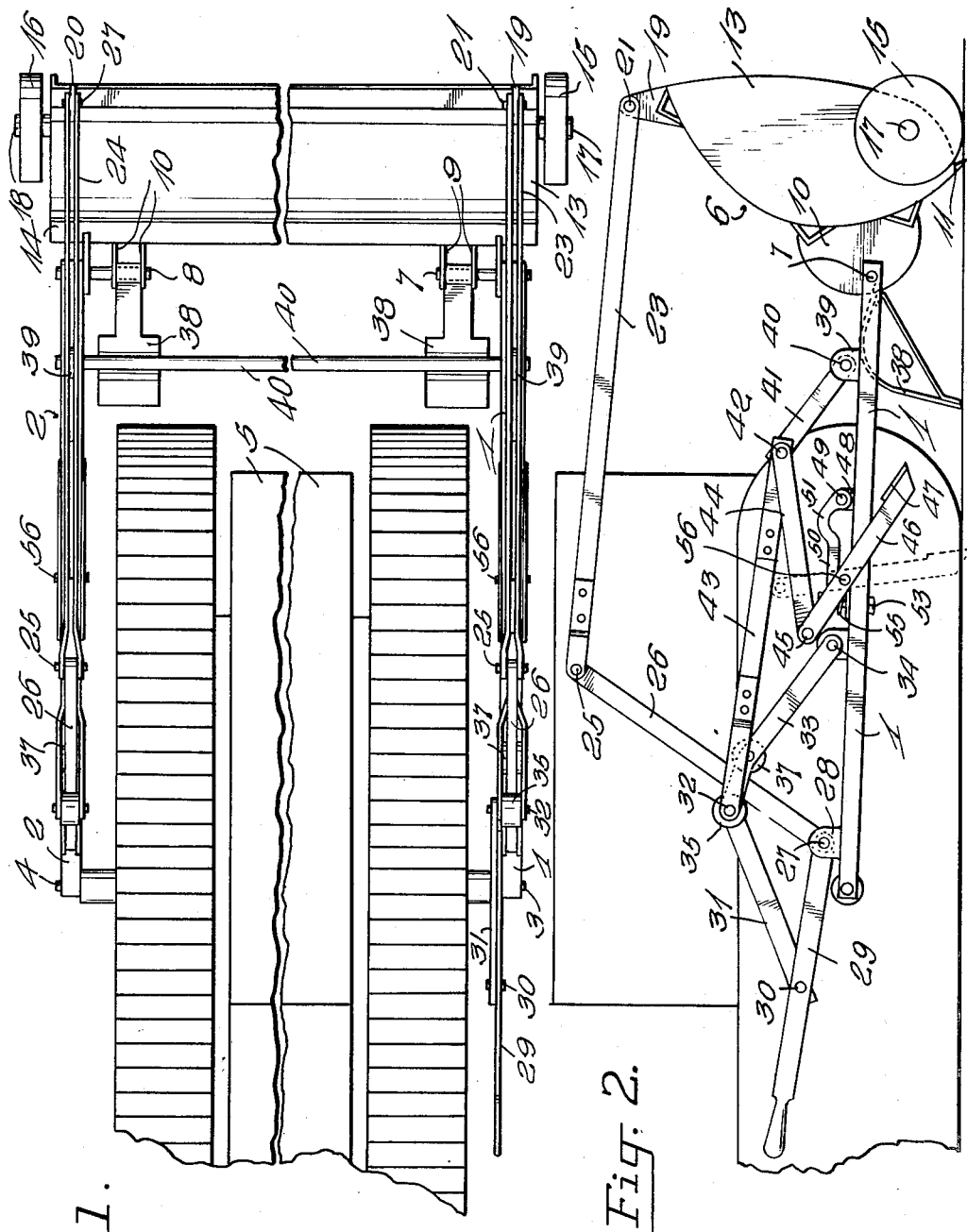

INVENTOR.
Henry W. Klages
BY
Atty.

Patented Oct. 26, 1954

2,692,447

UNITED STATES PATENT OFFICE 2,692,447

LAND LEVELING AND EXCAVATING MACHINE

Henry W. Klages, Portland, Oreg.

Application April 3, 1952, Serial No. 280,243

2 Claims. (Cl. 37—144)

This invention relates to improvements in land leveling and excavating machines of the type shown and described in my United States Patent No. 2,284,215 dated May 26, 1942, and in my co-pending application, Serial No. 258,040, filed November 24, 1951, now Patent No. 2,663,099.

It is one of the principal objects of the present invention to provide a scraper blade and moldboard which is adapted for operative attachment to various sizes and types of tractors and which is of more compact form and may be operated with a minimum amount of effort on the part of the operator, and wherein the operation of the mold-board is semi-automatic by the movement of the tractor in a forward or rearward direction of travel.

These and other objects will appear as my invention is more fully hereinafter described in the following specification, illustrated in the accompanying drawings and finally pointed out in the appended claims.

In the drawings:

Figure 1 is a fragmentary top plan view of land leveling apparatus made in accordance with my invention and applied to the forward end of any type of conventional tractor.

Figure 2 is a side elevation of Figure 1 showing the mold-board in a digging position.

Figure 3:
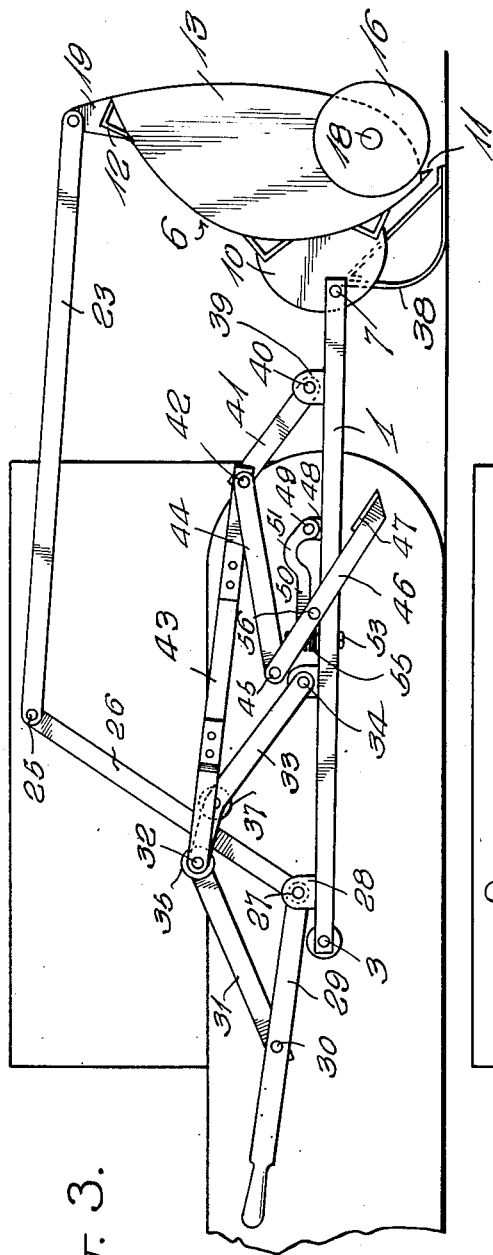
Figure 3 is a view similar to Figure 2 showing the mold-board in an elevated and inoperative position as the tractor is moving rearwardly.

Referring more particularly to the drawings, there is shown therein a device embodying my present invention which comprises a pair of parallel main beams indicated by reference numerals 1 and 2 pivotally attached at the rearward ends to stub shafts 3 and 4, respectively, secured to and extending outwardly from the side walls of the tractor body generally indicated at 5. To the forward ends of both beams, I pivotally attach a mold-board generally indicated at 6 by means of shafts 7 and 8 which extend through pairs of spaced parallel vertically extending plates 8, 9 and 10 secured to and extending rearwardly from the rear face of the mold-board.

The mold-board comprises a transverse cutting and scraping blade 11 of arcuate shape in cross-section and reinforced by longitudinal ribs 12 fabricated with or cast integrally with end plates 13 and 14 of the moldboard. To the lower ends of these end plates I rotatably attach supporting wheels 15 and 16 by means of stub shafts 17 and 18, respectively, secured to and extending outwardly from said end plates.

The top surface of the moldboard is provided with two spaced vertically extending disposed bearing brackets 19 and 20 to which are pivotally attached by means of pins 21 and 22, the forward ends of two toggle links 23 and 24. The opposite or rearward ends of the links 23—24 are pivotally attached as at 25 to the upper ends of companion links 26 whose opposite ends are pivotally attached as at 27 to vertical brackets 28 welded or otherwise secured to the beams 1 and 2.

Also pivotally attached to the brackets 28 at 27 is an actuating lever 29. Pivotally attached as at 30 to the lever 29 is one end of a link 31 whose opposite end is pivotally attached by means of a stub shaft 32 to the upper end of one of two arms 33 which are pivotally attached as at 34 to the beams 1 and 2.

Rotatably attached to the uppermost end of each arm 33, by means of the stub shafts 32 is a wheel or roller 35 adapted to bear against and roll lengthwise of top edges of the links 26. Spaced downwardly from the rollers 32 and rotatably attached as at 36 to each arm are companion rollers 37 adapted to bear against and roll along the bottom edges of the links 26. Thus by forward and rearward movement of the actuating lever 29 the links 23—26 may be raised or lowered with a resultant lowering or raising, respectively, of the moldboard and its cutting or scraping blade with respect to the ground or surface being dealt with.

Revolubly mounted upon the shafts 7 and 8 between the plates 9 and 10, respectively, in each case is a skid shoe 38. Each of the beams 1 is provided upon its upper side adjacent the forward end thereof with an ear 39 through which ears is extended a transverse shaft 40. An arm 41 has its lower end pivotally connected to the shaft 40 and its upper end pivoted to a shaft 42, one of such arms being provided adjacent each of the beams 1. A link 43 interconnects the shaft 42 with the shaft 32 upon each side of the apparatus and each of the shafts 42 has pivotally connected thereto one end of a link 44 whose other end in each case is pivotally connected, as indicated at 45, to the upper end of a lifting leg 46, the lower ends of the legs 46 being provided upon their forward sides with ground-engaging shoes 47, in each case.

Upon each of the beams 1 rearwardly of the ears 39 there is provided an ear 48 to which is pivotally connected, as indicated at 49, a generally rearwardly extending latch member 50. The latch member 50 is provided adjacent its forward end with an upwardly extending arcuate portion 51 and, at its rearward end with a foot 52. A bolt 53 extends upwardly through the beam 1 in each case and through the adjacent foot 52 and is provided adjacent its upper end with a nut 54. A compression spring 55 surrounds the bolt 53 and is adapted to bear against the upper side of the foot 52 in the underside of the nut 54 in each case. Each of the members 46 is provided with an inwardly extending fulcruming stub shaft 56 which extends between the latching member 50 and the beam 1 in each case.

Figure 4:
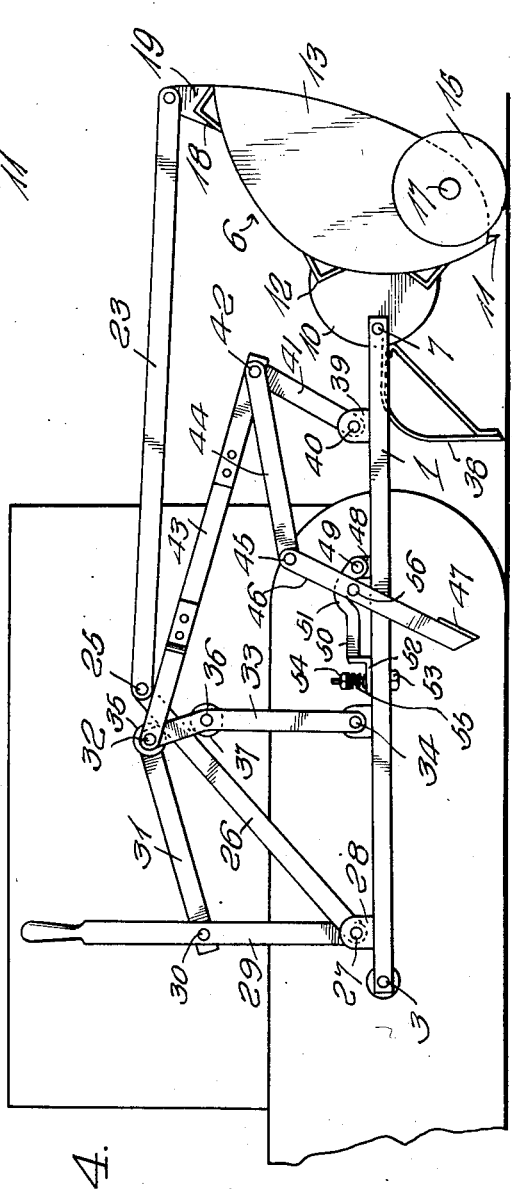
Figure 4 is also a view similar to Figure 2 showing the mold-board in a land-spreading position.

In operation, it will be apparent that as the tractor moves forwardly, the skid shoes 38 will engage the ground and be forced from their position as shown, for example, in Figure 3 to their position shown in Figure 2 thus allowing the beams 1 to pivot downwardly to thus bring the scraping blade 11 into contact with the ground. During this forward movement of the tractor, the operator of the apparatus may move the lever 29 in a clockwise position, as viewed, for example, in Figure 2 to thus bring the shoes 47 into ground engaging position. Through the forward movement the apparatus will cause the legs 46 to pivot to the dotted line position shown in Figure 2 and at the same time will cause the fulcruming pins 56 to move from their rearward positions beneath the latching members 50 to their forward positions in the arcuate portions 51 against the action of the springs 55 to thus latch the legs 46 with the shoes 47 in disengaged position with relation to the ground and with the upper end of the legs 46 in their forward positions as shown, for example, in Figure 4. During this action the links 43 will cause the rollers 35 to bear against the upper sides of the levers 26 thus forcing the links 23 forwardly to cause the moldboard 6 in its scraping position, again as illustrated in Figure 4. It will be apparent that the shoes 47 merely engage the ground for a very short space of time and therefore will not impede the forward progress of the apparatus as it continues to move in a forward direction.

When, however, the apparatus including the tractor is moved in a rearward direction, the members 38 will again engage the ground and be moved to their forward position as illustrated, for example, in Figure 3 thus lifting the beams 1 and likewise lifting the blade 11 from ground contact. During this operation the operator of the apparatus may move the lever 29 in a counterclockwise direction to its position illustrated, for example, in Figure 3 thus allowing the link 44 to force the legs 46 to their rearward position as illustrated in Figure 3 wherein the fulcruming members 56 are in their position adjacent the bolts 53. It will also be seen that this movement will again move the moldboard 6 to its inactive position as illustrated in Figure 3 and that the lever 29 is not caused to do all of the work necessary for this operation since the mere engagement of the shoes 47 in either the forward or rearward movement of the apparatus causes the completion of the job intended in each case by the lever 29.

While but one form of the invention has been shown and described herein, it will be readily apparent to those skilled in the art that many minor modifications may be made without departing from the spirit of the invention or the scope of the appended claims.

What is claimed is:

1. Land-levelling apparatus adapted for attachment to a tractor comprising a pair of beams each adapted to be pivotally attached at their rearward ends to opposite sides of said tractor, a transversely extending moldboard pivotally connected to the forward portions of said beams, a blade affixed to the lower edge of said moldboard, ground-contacting means revolvably attached to and depending from the forward portions of the beams and operable by the forward and rearward movement, respectively of the tractor for respectively lowering and raising said moldboard into and out of engagement with the earth, and means also operable by the forward and rearward movement, respectively, of said tractor for tilting the upper portion of said moldboard forwardly and rearwardly, respectively, said last-mentioned means including a pair of ground-engaging levers each fulcrumed substantially centrally upon each of said beams, a pair of relatively long links each connected to the upper portion of said moldboard at one side thereof, a pair of relatively short links, each interconnecting the rearward end of one of said long links and the rearward portion of one of said beams, a pair of upwardly extending roller carrying arms each pivotally connected at its lower end to one of said beams rearwardly of one of said ground-engaging levers, a pair of rollers carried by each of said roller carrying arms, and each pair of rollers respectively bearing upon the upper and lower sides of the associated shorter link, a pair of upwardly extending forward arms each pivoted to the forward portion of one of said beams, a link interconnecting the upper ends of each of said forward arms and said ground-engaging levers, and a link interconnecting the upper ends of each of said forward arms and said roller carrying arms.

2. A device as defined in claim 1 wherein a hand lever is pivotally connected at its lower end to the rear portion of one of said beams, and a link interconnects the central portion of said hand lever with the upper end of the adjacent roller-carrying arm.

References Cited in the file of this patent

UNITED STATES PATENTS

| Number | Name | Date |
|---|---|---|
| 2,284,215 | Klages | May 26, 1942 |
| 2,440,166 | Bourne et al. | Apr. 20, 1948 |
| 2,442,095 | Reed et al. | May 25, 1948 |
| 2,514,169 | Tidwell | July 4, 1950 |